Patented June 21, 1938

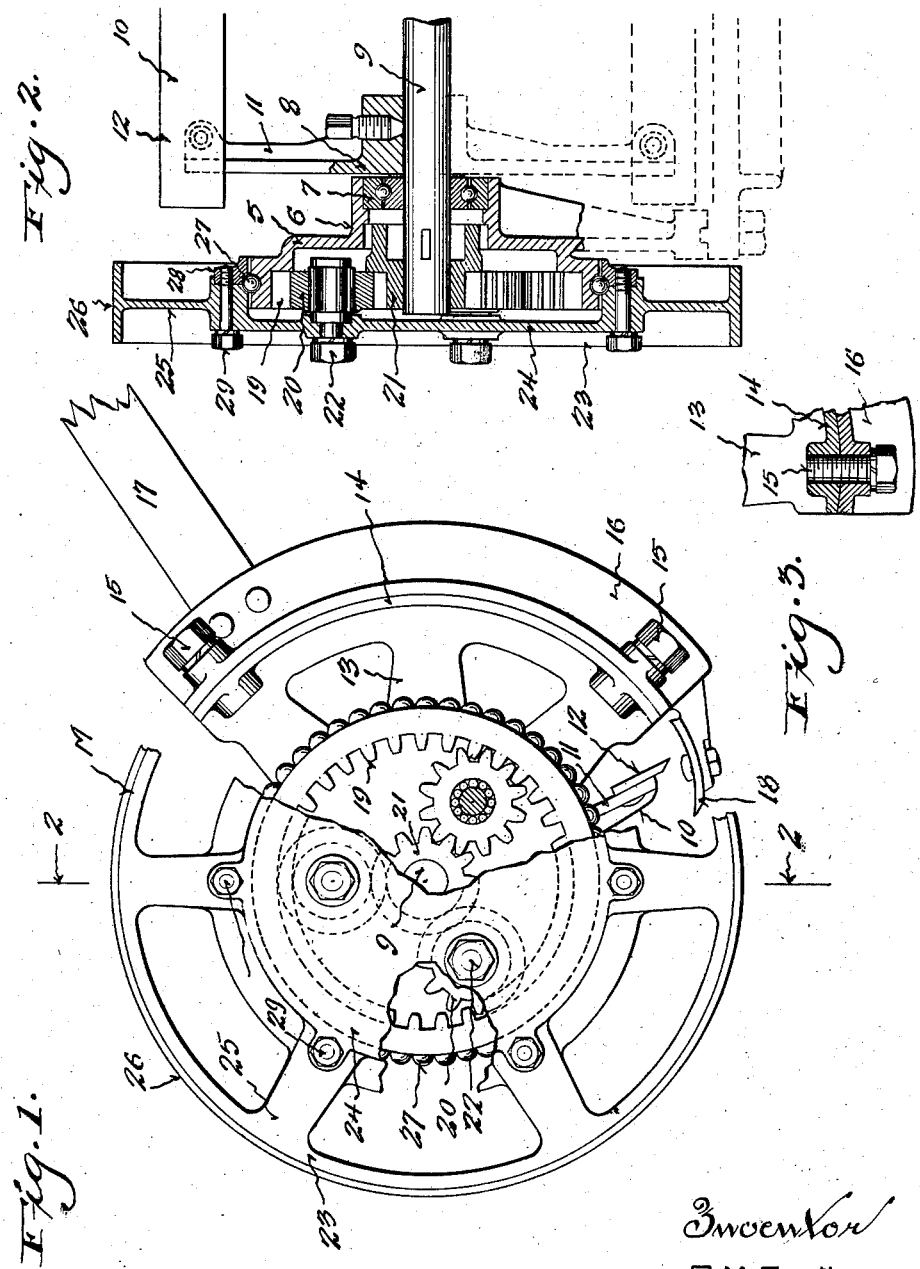

2,121,451

UNITED STATES PATENT OFFICE 2,121,451

LAWN MOWER

George M. Smith, Milwaukee, Wis.

Application April 29, 1937, Serial No. 139,763

2 Claims. (Cl. 56—253)

This invention appertains to lawn-mowers, and more particularly to a novel cutter drive and frame mounting therefor.

One of the primary objects of my invention is the provision of a plurality of idle or planetary pinions between the annular gear of the ground wheel and the drive pinion for the rotatable cutter shaft, whereby a balanced drive will be had without side thrust on the cutter shaft, and without undue strain on the teeth of the drive pinion and on the teeth of any one idle or planetary pinion.

Another salient object of my invention is the provision of a novel frame mounting with the ground wheels freely rotatable thereon and independent of the cutter shaft bearings, whereby the pushing thrust of the operator is not exerted on the central bearings, so that said bearings will be left entirely free for supporting the cutter shaft.

A further important object of my invention is the provision of end frame castings forming, in cooperation with the ground wheels, housings for the idle or planetary pinions and the drive pinions, with novel means between the frame plates and the ground wheels, whereby the ground wheels will be rotatably mounted directly on the periphery of said frame plates or castings.

A still further object of my invention is to provide a rotatable cutter drive and frame mounting for lawn-mowers of the above character, which will be durable and efficient in use, one that will be simple and easy to manufacture, and one which can be incorporated with a lawn-mower and placed upon the market at a reasonable price.

With these and other objects in view, the invention consists in the novel construction, arrangement, and formation of parts, as will be hereinafter more specifically described, claimed, and illustrated in the accompanying drawing, in which drawing:

Figure 1 is a fragmentary side elevation of a lawn-mower constructed in accordance with my invention, parts of the lawn-mower being shown broken away.

Figure 2 is a detail section through one end of the lawn-mower taken substantially on the line 2—2 of Figure 1, looking in the direction of the arrows.

Figure 3 is a detail, fragmentary sectional view illustrating the means of connecting the cross-frame with the end frame plates or castings.

Referring to the drawing in detail, wherein similar reference characters designate corresponding parts throughout the several views, the letter M generally indicates the improved lawn-mower, and, as illustrated, the same includes an end frame plate or casting 5.

This end frame plate has formed thereon an axial sleeve 6 for receiving raceways 7 for roller or ball bearings 8 utilized for rotatably supporting the cutter shaft 9. This shaft 9 carries the usual or any preferred type of cutting reel 10.

As illustrated, the cutting reel 10 includes end hubs 11 connected by cutter blades 12. The end frame plate and its axial hub bearing sleeve 6 have formed thereon radially extending frame arms 13, which are connected by a partial or arcuate rim band 14. This rim band 14 has bolted thereto, as at 15, the cross-frame 16. This frame plate is secured at its opposite end to the other end frame plate or casting (not shown). The cross-frame carries the U-shaped yoke 17 for the handle and the stationary cutter bar 18. Likewise, the lawn-roller (not shown) and other attachments can be secured to this cross-frame.

Referring back to the end frame plate or casting 5, it will be noted that the same is of a cup-shape and has formed on its inner periphery the annular gear 19. This gear 19 has meshing therewith at equidistantly spaced points the idle or planetary gears 20. These idle or planetary gears in turn mesh with the axially disposed cutter drive pinion 21, which is rotatably mounted on the cutter shaft 9. A suitable ratchet mechanism (not shown) is utilized for operatively connecting the drive pinion 21 with the cutter shaft 9.

All of the planetary or idle pinions 20 are rotatably mounted upon stud bolts or stub shafts 22 carried by the ground wheel 23. Suitable roller or ball bearings can be provided between the idle pinions 20 and the stud bolts 22.

The hub 24 of the ground wheel 23 is of an enlarged cup-shape and has connected therewith by means of radially extending spokes 25 the rim 26. The inner surface of the cup-shaped hub 24 completely surrounds the outer periphery of the end frame plate or casting 5, and this outer face of the frame plate has formed therein a raceway for the reception of roller or ball bearings 27. The inner surface of the cup-shaped hub 24 is also formed to provide a partial raceway for receiving the bolts, and a removable retaining ring 28 is provided for completing this raceway. The retaining ring 28 is held in place by means of bolts 29, which extend through the wheel and the ring.

I lay great stress upon the use of the plurality of pinions 20, as by using two or more of these pinions the side thrust on the cutter drive pinion 21, present when only one idle pinion is used, is entirely eliminated. Also, when using two or more of the idle or planetary pinions, each pinion is driving, thus reducing the strain on the one tooth when only one idle or planetary pinion is used. By dividing the load evenly among two or more teeth, these parts can be made considerably lighter, providing ease of operation.

Likewise, the mounting of the ground wheels on the end frame plates or castings is important, as the load or push of the operator is not transmitted through the central bearing, but leaves that bearing entirely free for the support of the cutter shaft 9, and the traction ground wheel is supported independently by a ball or roller bearing directly on the end plate, as described and shown.

Changes in details may be made, but what I claim as new is:

1. In a lawn-mower, an end plate of a cup-shape having its inner periphery provided with an annular gear, a ground traction wheel having its hub of a cup-shape and receiving the end plate, a rotatable cutter shaft extending into the plate, a drive pinion on the cutter shaft, and a plurality of equidistantly spaced planetary gears rotatably carried by the hub, meshing with the teeth of the annular gear and the teeth of the drive pinion, said planetary gears and the drive pinion being housed entirely within the cup-shaped end plate and the cup-shaped hub.

2. In a lawn-mower, an end plate of a cup-shape having its inner periphery provided with an annular gear, a ground traction wheel having its hub of a cup-shape and receiving the end plate, a rotatable cutter shaft extending into the plate, a drive pinion on the cutter shaft, and a plurality of equidistantly spaced planetary gears rotatably carried by the hub, meshing with the teeth of the annular gear and the teeth of the drive pinion, said planetary gears and the drive pinion being housed entirely within the cup-shaped end plate and the cup-shaped hub, the hub of the traction wheel being rotatably mounted directly on the periphery of the end plate and supported solely thereby.

GEORGE M. SMITH.